US012293129B2

(12) United States Patent
Xu

(10) Patent No.: US 12,293,129 B2
(45) Date of Patent: May 6, 2025

(54) METHOD FOR ACTIVATING AUDIO DEVICE, AND TERMINAL AND COMPUTER-READABLE STORAGE MEDIUM

(71) Applicant: ZTE CORPORATION, Shenzhen (CN)

(72) Inventor: Mei Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 252 days.

(21) Appl. No.: 18/011,909

(22) PCT Filed: Aug. 25, 2021

(86) PCT No.: PCT/CN2021/114568
§ 371 (c)(1),
(2) Date: Dec. 21, 2022

(87) PCT Pub. No.: WO2022/068476
PCT Pub. Date: Apr. 7, 2022

(65) Prior Publication Data
US 2023/0244439 A1    Aug. 3, 2023

(30) Foreign Application Priority Data

Sep. 29, 2020   (CN) .......................... 202011047831.6

(51) Int. Cl.
*G06F 3/16*   (2006.01)
(52) U.S. Cl.
CPC .............. *G06F 3/165* (2013.01); *G06F 3/162* (2013.01)

(58) Field of Classification Search
CPC ................................ G06F 3/165; G06F 3/162
See application file for complete search history.

(56) References Cited

U.S. PATENT DOCUMENTS

| 2012/0054613 | A1* | 3/2012 | Yoo ........................ H04M 1/724 715/716 |
| 2013/0283164 | A1* | 10/2013 | Mahalingam ........... G06F 3/165 710/64 |

(Continued)

FOREIGN PATENT DOCUMENTS

| CN | 108632448 A | 10/2018 |
| CN | 108781236 A | 11/2018 |

(Continued)

OTHER PUBLICATIONS

European Patent Office. Extended European Search Report for EP Application No. 21874137.9, mailed Nov. 8, 2023, pp. 1-9.

(Continued)

*Primary Examiner* — Fan S Tsang
*Assistant Examiner* — David Siegel
(74) *Attorney, Agent, or Firm* — Vivacqua Crane, PLLC

(57) ABSTRACT

Disclosed are a method for activating an audio device, a terminal device and a computer-readable storage medium. The method may include: acquiring an attribute of an audio application; acquiring an audio device identification (ID) mapped to the attribute from a preset audio device switching routing table according to the attribute, wherein the audio device ID mapped to the attribute may include: an audio device ID of an audio device codec corresponding to the attribute; and activating the audio device corresponding to the audio device ID.

11 Claims, 4 Drawing Sheets

(56) References Cited

U.S. PATENT DOCUMENTS

2017/0257700 A1* 9/2017 Yang .................. H04R 3/00
2018/0324486 A1* 11/2018 Lee .................. H04L 65/1089

FOREIGN PATENT DOCUMENTS

CN 109857364 A 6/2019
CN 110764730 A 2/2020

OTHER PUBLICATIONS

International Searching Authority. International Search Report and Written Opinion for PCT Application ho. PCT/CN2021/114568 and English translation, mailed Oct. 28, 2021, pp. 1-9.

* cited by examiner

METHOD FOR ACTIVATING AUDIO DEVICE, AND TERMINAL AND COMPUTER-READABLE STORAGE MEDIUM

CROSS-REFERENCE TO RELATED APPLICATION

This application is a national stage filing under 35 U.S.C. § 371 of international application number PCT/CN2021/114568, filed Aug. 25, 2021, which claims priority to Chinese patent application No. 202011047831.6, filed Sep. 29, 2020. The contents of these applications are incorporated herein by reference in their entirety.

TECHNICAL FIELD

Embodiments of the present disclosure relate to, but are not limited to, the field of communications, and more particularly, relate to, but are not limited to, a method for activating an audio device, a terminal device and a computer-readable storage medium.

BACKGROUND

As more applications are installed on terminal devices, it has become a general trend for a terminal device to be connected to multiple playback devices. Currently, a terminal device may be connected to multiple audio playback devices, but only one device is active and outputs audio by default at a time. In the face of multiple applications with different audio effects, a user needs to manually switch the audio device to play the audio. However, the user may not know which audio device is more suitable for which audio, so that the user's experience in playing the audio on the terminal device is poor, and the operation of switching the audio device is complex.

SUMMARY

Embodiments of the present disclosure provide a method for activating an audio device, a terminal device and a computer-readable storage medium to solve, at least to some extent, the technical problems of poor user experience in terminal device audio playing and complicated operation of audio device switching.

In view of the above, an embodiment of the present disclosure provides a method for activating an audio device. The method may include: acquiring an attribute of an audio application; acquiring an audio device identification (ID) mapped to the attribute from a preset audio device switching routing table according to the attribute, where the audio device ID mapped to the attribute may include an audio device ID of an audio device codec corresponding to the attribute; and activating an audio device corresponding to the audio device ID.

An embodiment of the present disclosure further provides a terminal device. The device may include a first acquisition module, a second acquisition module, and an activation module, where the first acquisition module is configured for acquiring an attribute of an audio application; the second acquisition module is configured for acquiring an audio device identification (ID) mapped to the attribute from a preset audio device switching routing table according to the attribute, where the audio device ID mapped to the attribute may include an audio device ID of an audio device codec corresponding to the attribute; and the activation module is configured for activating an audio device corresponding to the audio device ID.

An embodiment of the present disclosure further provides a terminal device. The terminal device may include a processor, a memory, and a communication bus, where the communication bus is configured for implementing connection and communication between the processor and the memory; and the processor is configured for executing one or more computer programs stored in the memory to implement the above method for activating an audio device.

An embodiment of the present disclosure further provides a computer-readable storage medium storing one or more computer programs which, when executed by one or more processors, cause the one or more processors to implement the above method for activating an audio device.

Additional features and advantages of the present disclosure will be set forth in the description which follows, and in part will be obvious from the description, or may be learned by the practice of the present disclosure.

DETAILED DESCRIPTION

Objects, technical schemes and advantages of the present disclosure will be clear from a detailed description of embodiments of the present disclosure in conjunction with the drawings. It should be understood that the embodiments described herein are merely used for illustrating the present disclosure, and are not intended to limit the present disclosure.

Embodiment One

To solve the technical problems of poor user experience in terminal device audio playing and complicated operation of audio device switching, the present disclosure provides a method for activating an audio device, which will be described below in connection with this embodiment.

Figure 1:
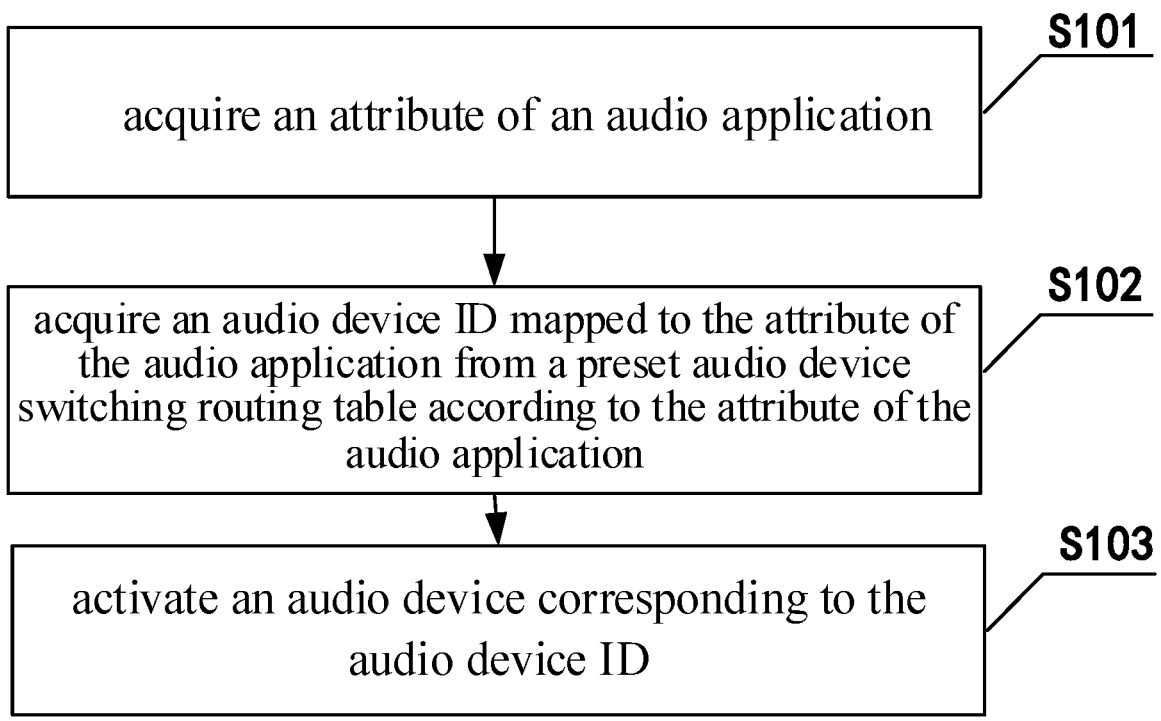
FIG. 1 is a basic flowchart of a method for activating an audio device according to Embodiment One of the present disclosure.

Referring to FIG. 1, FIG. 1 is a basic flowchart of a method for activating an audio device according to Embodiment One of the present disclosure. The method includes the following steps S101 to S103.

At S101, an attribute of an audio application is acquired.

In this embodiment, the attribute of the audio application may be acquired before the audio application is opened, or may be acquired during or after the opening of the audio application. When there is one audio application, the opening of the audio application may include: opening an audio application for the first time or switching from a first audio application to a second audio application. For example, Tencent Meeting is opened for the first time; or switching from NetEase Cloud Music to a WeChat call is performed. The above examples are for description purposes only and are not intended to limit the specific audio application type.

In some embodiments, in a case where there are at least two audio applications, when the audio applications are opened, the acquiring an attribute of an audio application includes: when the at least two audio applications are opened successively, acquiring attributes of the at least two audio applications respectively. For example, a user opens QQ Music, Romance of the Three Kingdoms, Himalaya, etc., successively; or the user opens Tencent Meeting and NetEase Cloud Music, and then switches from NetEase Cloud Music to WeChat, etc. The above examples are for description purposes only and are not intended to limit the specific audio application type. In addition, the opening sequence of the at least two audio applications is not limited herein.

The attribute of the audio application includes: a package name of the application and an audio parameter of the application.

In some examples, acquiring an attribute of an audio application may be acquiring an attribute of an audio application when the audio application is opened.

In some embodiments, before acquiring an attribute of an audio application, the method may further include:

if an instruction of selecting an audio device ID is received, acquiring the audio device ID selected by the instruction, and activating an audio device corresponding to the selected audio device ID. Before activating the audio device corresponding to the selected audio device ID, the method may further include: acquiring an attribute of the audio application, establishing a mapping relationship between the attribute of the audio application and the selected audio device ID, and updating the audio device ID mapped to the attribute of the audio application in a preset audio device switching routing table. Updating the routing table may be performed before, after or during the activation of the audio device corresponding to the selected audio device ID.

If the instruction of selecting the audio device ID is not received from the user, the attribute of the audio application is acquired, an audio device ID of an audio device codec corresponding to the attribute is found in the preset audio device switching routing table, and an audio device corresponding to the audio device ID is activated. "Not receiving the instruction of selecting the audio device ID" may be receiving a selection of the user to automatically acquire the audio device ID or automatically jump to acquire the attribute of the audio application when a preset time is reached. A user selection instruction or a voice selection instruction may be received on a display of a terminal device.

At S102, an audio device ID mapped to the attribute of the audio application is acquired from a preset audio device switching routing table according to the attribute of the audio application.

The audio device ID mapped to the attribute includes: an audio device ID of an audio device codec corresponding to the attribute. The audio device ID may be a serial number or a label corresponding to the audio device.

In some embodiments, the audio device may be a wired audio playback device or a wireless audio playback device. The wireless audio playback device includes a Bluetooth playback device. The description of the above audio devices is given by way of example only, and the present disclosure is not limited to the above audio devices.

In some embodiments, the preset audio device switching routing table includes: the attribute of the audio application, the codec of the audio device, and the audio device ID. The audio device ID may further include: a user-preset audio device ID corresponding to the attribute of the audio application. The acquiring the audio device ID mapped to the attribute of the audio application may further include: acquiring the audio device ID mapped to the attribute from the preset audio device switching routing table according to the attribute of the audio application, and selecting the audio device ID according to a preset audio device priority.

In some embodiments, when there is one audio application, the acquiring an audio device ID mapped to the attribute of the audio application from a preset audio device switching routing table according to the attribute includes: acquiring one or at least two audio device IDs mapped to the attribute of the audio application from the preset audio device switching routing table according to the attribute.

When one audio device ID mapped to the attribute is acquired, an audio device corresponding to the audio device ID is activated.

When at least two audio device IDs mapped to the attribute are acquired, a preset number of target audio device IDs are acquired from the at least two audio device IDs, and audio devices corresponding to the target audio device IDs are activated, where the preset number includes one or at least two. When at least two audio device IDs mapped to the attribute of the audio application are acquired and it is detected that the terminal device supports playing one audio application through at least two audio devices simultaneously, a preset number of audio device IDs supported by the terminal device are acquired according to preset priorities.

In some embodiments, when there is one audio application, the opening of the audio application may include: opening or downloading an audio application for the first time or switching from a first audio application to a second audio application. When switching is performed from the first audio application to the second audio application, an attribute of the second audio application is acquired.

In some embodiments, when there are at least two audio applications, the acquiring an attribute of an audio application includes: when the at least two audio applications are opened successively, acquiring attributes of the at least two audio applications respectively.

When the preset audio device routing table does not include an attribute and an audio device ID of a terminal device audio application, an audio device ID selection box is displayed on the display of the terminal device or a voice prompt is issued, and the audio device ID is acquired according to a user selection. Alternatively, the attribute of the terminal device application is compared with the attributes in the preset audio device switching routing table, and an audio device corresponding to a similar attribute is used as an audio device mapped to the attribute of the terminal device application. When the attribute and the similar attribute are detected at the same time, a selection prompt of activating an audio device mapped to this attribute is sent to the user, the audio device ID is acquired according to the user's prompt, and an audio device specified by the user is activated. If an audio device mapped to the similar attribute in the routing table is not acquired, an audio device ID of an audio device other than the audio device corresponding to the similar attribute is acquired, and the audio device is activated.

At S103, an audio device corresponding to the audio device ID is activated.

In some embodiments, when there is one audio application, and it is switched from the first audio application to the second audio application, an attribute of the second audio application is acquired. Activating an audio device mapped to the attribute of the second audio application may include: popping up a selection interface on the display of the terminal device, and according to a selection instruction, activating an audio device corresponding to the audio device ID mapped to the attribute of the second audio application or maintaining a connection of an activated audio device corresponding to the first audio application to the second audio application.

In some embodiments, when there are at least two audio applications, the acquiring an attribute of an audio application includes: when at least two audio applications are opened successively, acquiring attributes of the at least two audio applications respectively. The activating an audio device corresponding to the audio device ID includes: detecting whether the terminal device supports simultaneous audio output of multiple audio applications, and when it is detecting that the terminal device supports simultaneous audio output of multiple audio applications, activating different audio devices mapped to the attributes of the at least two audio applications, respectively. When the attributes of the at least two audio applications map the same audio device ID, another audio device ID corresponding to attributes of at least two audio applications is selected automatically.

In some embodiments, when there are at least two audio applications, the acquiring an attribute of an audio application includes: when the at least two audio applications are downloaded successively, acquiring attributes of the at least two audio applications respectively. The attributes of the at least two audio applications may also be acquired respectively after the at least two audio applications are downloaded. As for how to activate the corresponding audio devices after downloading the at least two audio applications successively, the following activation method when at least two audio device applications are opened successively may be adopted, or audio devices corresponding to related audio device IDs may be activated according to a preset rule. The preset rule is: an audio application downloaded earlier has priority in acquiring an audio device ID, and an audio application downloaded later is not allowed to acquire the audio device ID that has already been acquired.

When at least two audio applications are opened successively, attributes of the at least two audio applications are acquired respectively. The activating an audio device corresponding to the audio device ID includes:

when it is detected that a shared audio device ID exists in the audio device IDs mapped to the attributes of the at least two audio applications, activating the audio device in the following manner:

when it is detected that the shared audio device ID is an audio device ID with a highest priority among audio device IDs mapped to an attribute of a fourth audio application, connecting the fourth audio application to an audio device corresponding to the shared audio device ID, and connecting a third audio application to another audio device, where the another audio device is different from the audio device to which the fourth audio application is connected; and when it is detected that the shared audio device ID is not the audio device ID with the highest priority among the audio device IDs mapped to the attribute of the fourth audio application, connecting the fourth audio application to the audio device corresponding to the audio device ID with the highest priority, and maintaining a connection of the third audio application to an audio device to which the third audio application is originally connected. The maintaining a connection of the third audio application to an audio device to which the third audio application is originally connected may further include: detecting whether the originally connected audio device is an audio device with a highest priority for the third audio application, and if not, switching to the audio device with the highest priority. The third audio application is an audio application opened earlier. The fourth audio application is an audio application opened later.

In some embodiments, when it is detected that a shared audio device ID exists in the audio device IDs mapped to the attributes of the at least two audio applications, and the attributes of both the at least two audio applications map multiple audio device IDs, the shared audio device ID is excluded, and the at least two successively opened audio applications are respectively connected to other audio devices.

In some embodiments, when it is detected that the attribute of the audio application opened later maps at least two audio device IDs, that the attribute of the audio application opened earlier maps one audio device ID, and that the shared audio device ID is an audio device ID with a highest priority among the audio device IDs mapped to the attributes of the audio applications opened earlier and later, the audio application opened later may be connected to an audio device corresponding to the audio device ID with a second highest priority, and the audio application opened earlier may be connected to an audio device corresponding to the shared audio device ID.

When it is detected that no shared audio device ID exists in the audio device IDs mapped to the attributes of the at least two audio applications, a method for activating each audio application in the at least two audio applications may be acquiring the audio device ID and activating the related audio device according to the method for activating an application when there is one audio application.

After detecting that the shared audio device ID is an audio device ID with a highest priority among audio device IDs mapped to an attribute of a fourth audio application, the following cases may be further included that:

the attribute of the audio application opened earlier maps at least one audio device ID, and the audio device ID with the highest priority mapped to the attribute of the audio application opened earlier is the same as the audio device ID with the highest priority mapped to the attribute of the audio application opened later; or the attribute of the audio application opened later maps multiple audio device IDs, the attribute of the audio application opened earlier maps at least one audio device ID, and the audio device ID with the highest priority mapped to the attribute of the audio application opened earlier is the same as the audio device ID with the highest priority mapped to the attribute of the audio application opened later; or the attribute of the audio application opened later maps only one audio device ID, the attribute of the audio application opened earlier maps at least one audio device ID, and there is no conflict between the audio device ID with the highest priority of the audio application opened earlier and the audio device ID with the highest priority of the audio application opened later; or the attribute of the audio application opened later maps at least two audio device IDs, the attribute of the audio application opened earlier maps at least one audio device ID, and there is no conflict between the audio device ID with the highest priority mapped to the attribute of the audio application opened earlier and the audio device ID with the highest priority mapped to the attribute of the audio application opened later.

In the above case where the attribute of the audio application opened earlier maps multiple audio device IDs and the attribute of the audio application opened later maps at least one audio device ID, no matter whether there is a conflict between the audio device ID with the highest priority of the audio application opened earlier and the audio device ID with the highest priority of the audio application opened later, the audio application opened earlier may be connected to the audio device corresponding to the audio device ID with the second highest priority. The audio device ID with the second highest priority herein is the audio device ID with the second highest priority among the audio device IDs mapped to the attribute of the audio application opened earlier. The audio application opened earlier may also be connected to another audio device. The another audio device herein may not be the audio device corresponding to the audio device ID mapped to the attribute of the audio application opened earlier. The audio application opened later is connected to an audio device that conflicts with the audio application opened earlier. In the case where the attribute of the audio application opened later maps at least two audio device IDs, the audio application opened later may also be connected to multiple audio devices at the same time, and the number of the audio devices connected may be a number of audio devices supported by the terminal device that are acquired based on preset priorities.

Alternatively, in the case where the attribute of the audio application opened earlier maps multiple audio device IDs, the attribute of the audio application opened later maps at least one audio device ID, and the audio device ID with the highest priority of the audio application opened earlier is the same as the audio device ID with the highest priority of the audio application opened later, the successively opened audio applications may be randomly connected to non-conflicting audio devices respectively.

In the case where the attribute of the audio application opened earlier maps one audio device ID and the attribute of the audio application opened later also maps one audio device ID, the audio application opened earlier is connected to another audio device, where the another audio device is different from the audio devices corresponding to the audio device IDs mapped to the attribute of the audio application opened later. The audio application opened later is connected to an audio device that conflicts with the audio application opened earlier. Connecting the audio application opened earlier to another audio device may include: randomly selecting another audio device or acquiring an audio device ID corresponding to an attribute similar to the attribute of the audio application opened earlier, and connecting the audio application opened earlier to an audio device corresponding to the audio device ID.

In the case where the attribute of the audio application opened earlier maps one audio device ID and the attribute of the audio application opened later maps multiple audio device IDs, the audio application opened earlier is connected to another audio device, where the another audio device is different from the audio devices corresponding to the audio device IDs mapped to the attribute of the audio application opened later. The audio application opened later is connected to an audio device that conflicts with the audio application opened earlier. Alternatively, in the case where the attribute of the audio application opened later maps at least two audio device IDs, the audio application opened later may also be connected to multiple audio devices at the same time, and the number of the audio devices connected may be a number of audio devices supported by the terminal device that are acquired based on preset priorities.

According to the method for activating an audio device provided in the embodiments of the present disclosure, an attribute of an audio application is acquired; an audio device ID mapped to the attribute is acquired from a preset audio device switching routing table according to the attribute; and an audio device corresponding to the audio device ID is activated. In some implementation processes, technical effects including but not limited to allowing the user to switch to an appropriate audio device and realizing the selection of an audio device for audio playback according to different playback applications can be achieved.

Embodiment Two

The method for activating an audio device of the present disclosure allows the user to switch to an appropriate audio device and realizes the selection of an appropriate audio device for playback according to different playback applications. For ease of understanding, the method for activating an audio device of the present disclosure is described below in connection with an application scenario.

Figure 2:
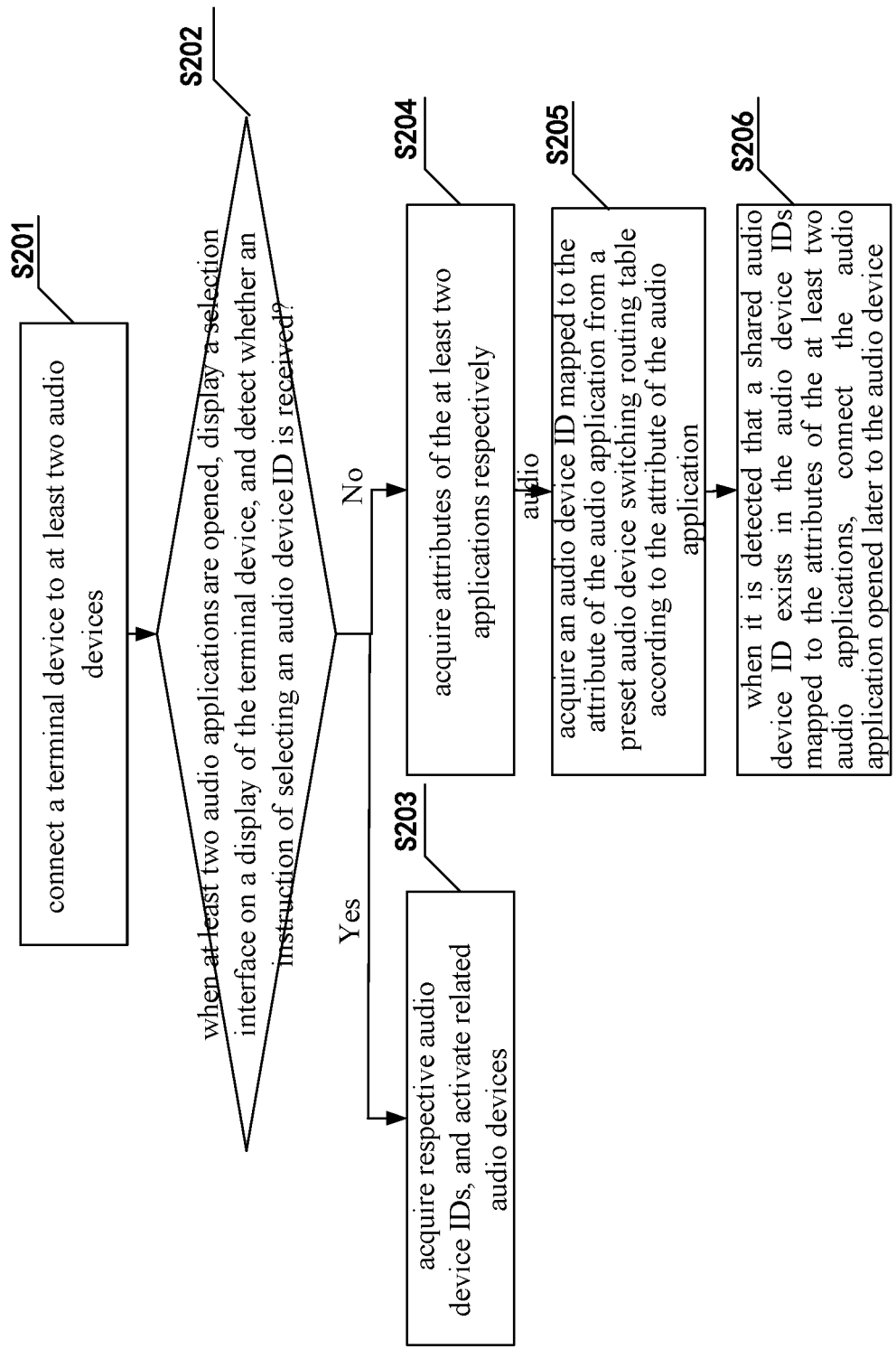
FIG. 2 is a detailed flowchart of a method for activating an audio device according to Embodiment Two of the present disclosure.

FIG. 2 is a detailed flowchart of a method for activating an audio device according to Embodiment Two of the present disclosure. The method for activating an audio device includes the following steps S201 to S206.

At S201, a terminal device is connected to at least two audio devices.

In this embodiment, the terminal device supports simultaneous output of multiple audio applications. In this embodiment, the audio devices are playback devices connected to the terminal device via Bluetooth.

At S202, when at least two audio applications are opened, a selection interface is displayed on a display of the terminal device, and it is detected whether an instruction of selecting an audio device ID is received.

If the instruction of selecting the audio device ID is received, S203 is executed, and if the instruction of selecting the audio device ID is not received, S204 is executed. "Not receiving the instruction of selecting the audio device" includes: receiving an instruction of automatically acquiring the audio device ID that is triggered by a user selection, or not receiving any instruction within a preset time.

At S203, respective audio device IDs are acquired, and related audio devices are activated.

At S204, attributes of the at least two audio applications are acquired respectively.

In this embodiment, the attribute of the audio application includes: a package name of the application and an audio parameter of the application. The audio applications in this embodiment include: Tencent Meeting, QQ Music, and Legends of the Three Kingdoms. The description of the above audio applications is given by way of example only, and the present disclosure is not limited to the above audio applications.

At S205, an audio device ID mapped to the attribute of the audio application is acquired from a preset audio device switching routing table according to the attribute of the audio application.

In this embodiment, the preset audio device switching routing table includes: the attribute of the audio application, a codec of the audio device, and at least two audio device IDs. The audio device ID includes: an audio device ID mapped according to the attribute of the audio application and the codec of the audio device.

In this embodiment, the codec of the audio device includes, but is not limited to, aptx, LDAC, aptx HD, WBS, aptx adaptive, etc. Bluetooth devices that support aptx, LDAC, and aptx HD may be used as a playback device group mainly used to support the output of music applications. Bluetooth devices that support WBS may be used as a playback device group mainly used to support the output of telephone applications. Bluetooth devices that support aptx adaptive may be used as a playback device group mainly used to support the output of game applications.

The audio device ID in this embodiment is classified according to the Bluetooth audio codec, and priorities are set for the audio device ID.

At S206, when it is detected that a shared audio device ID exists in the audio device IDs mapped to the attributes of the at least two audio applications, the audio application opened later is connected to the audio device corresponding to the shared audio device ID.

For example, when it is detected that a music application plays music, an optimal Bluetooth device A is selected for the music application. Subsequently when a game application is opened, and it is found that the optimal device A for game playback is already occupied by the music application, switching may be performed to connect the music application to another optimal Bluetooth device B and connect the game application to the device A.

In this embodiment, when the user opens a music player application, an application package name is extracted. According to a device switching routing table, an Aptx Bluetooth codec and sound effect are set for the music player application. Then, a device with Aptx sound quality is selected according to the Bluetooth codec and sound effect, and activated. Then the user opens a game application. An aptx adaptive Bluetooth codec and sound effect are set for the game application, and then a device in the playback group with aptx adaptive sound quality is selected according to the Bluetooth codec and sound effect, and activated.

According to the method for activating an audio device provided in the embodiments of the present disclosure, a terminal device is connected to at least two audio devices. When at least two audio applications are opened, a selection interface is displayed on a display of the terminal device, and it is detected whether an instruction of selecting an audio device ID is received. If the instruction of selecting the audio device ID is received, respective audio device IDs are acquired, and related audio devices are activated. If the instruction of selecting the audio device ID is not received, attributes of the at least two audio applications are acquired respectively; audio device IDs mapped to the attributes are acquired from a preset audio device switching routing table according to the attributes; and when it is detected that a shared audio device ID exists in the audio device IDs mapped to the attributes of the at least two audio applications, the audio application opened later is connected to the audio device corresponding to the shared audio device ID. In some implementation processes, technical effects including but not limited to allowing the user to switch to an appropriate audio device and realizing the intelligent selection of an appropriate audio device for playback according to the attributes of different playback applications can be achieved, thereby improving the user experience.

Embodiment Three

The method for activating an audio device of the present disclosure allows the user to switch to an appropriate audio device and realizes the selection of an appropriate audio device for playback according to different playback applications. For ease of understanding, the method for activating an audio device of the present disclosure is described below in connection with an application scenario.

Figure 3:
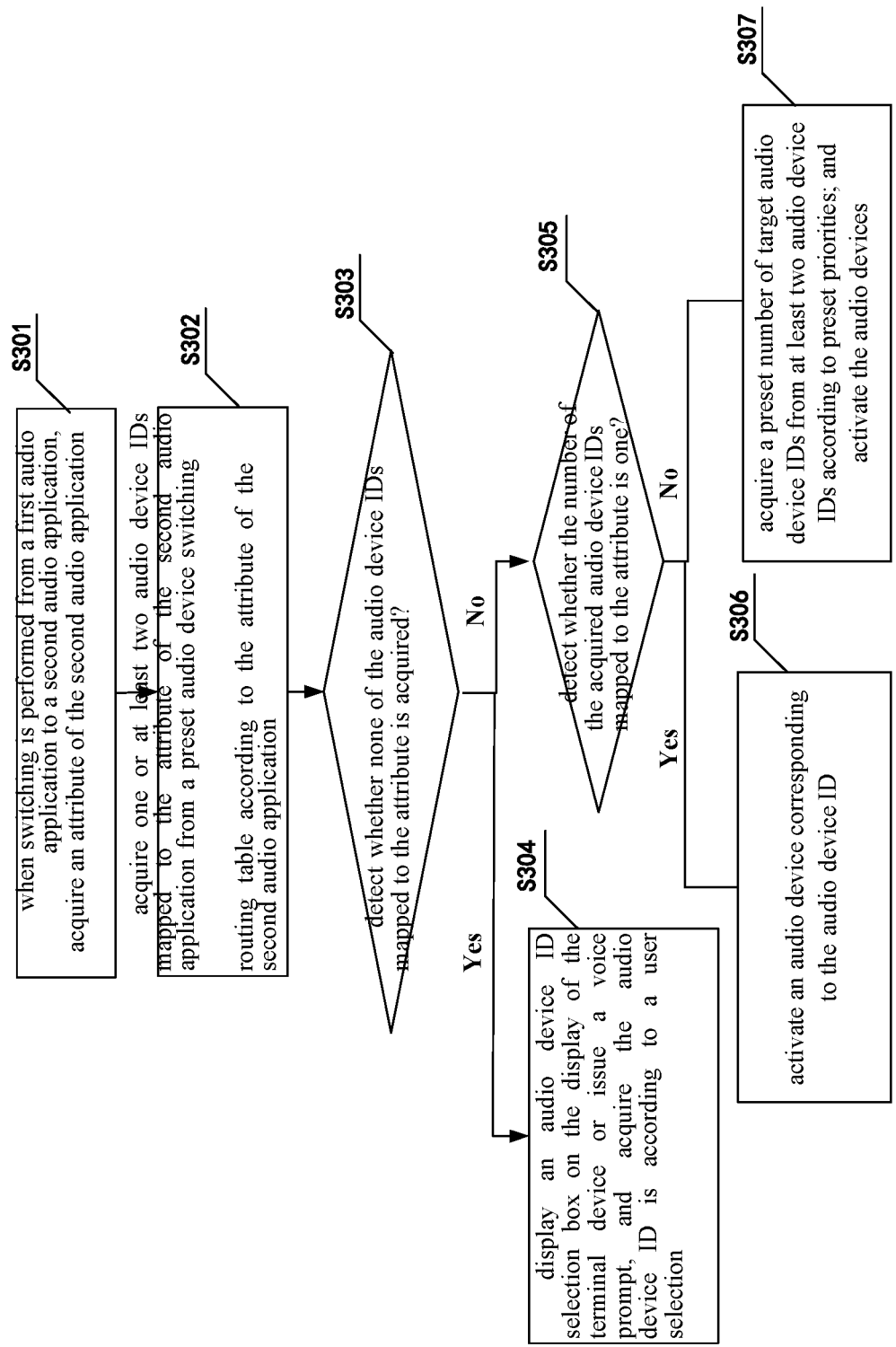
FIG. 3 is a detailed flowchart of a method for activating an audio device according to Embodiment Three of the present disclosure.

FIG. 3 is a detailed flowchart of a method for activating an audio device according to Embodiment Three of the present disclosure. The method for activating an audio device includes the following steps S301 to S307.

In this embodiment, the terminal device supports simultaneous output of multiple audio applications and multiple outputs of one audio application. In this embodiment, the audio devices are playback devices connected to the terminal device via Bluetooth, e.g., Bluetooth headsets, projectors, etc.

At S301, when switching is performed from a first audio application to a second audio application, an attribute of the second audio application is acquired.

In this embodiment, the attribute of the audio application includes: a package name of the application, an audio parameter of the application, etc. The audio applications in this embodiment include: WeChat, NetEase Cloud Music, and Exhilarating Battlefield. The description of the above audio applications is given by way of example only, and the present disclosure is not limited to the above audio applications.

At S302, one or at least two audio device IDs mapped to the attribute of the second audio application are acquired from a preset audio device switching routing table according to the attribute of the second audio application.

In this embodiment, the preset audio device switching routing table includes: the attribute of the audio application, a codec of the audio device, at least two audio device IDs. The audio device ID includes: an audio device ID mapped according to the attribute of the audio application and the codec of the audio device; and an audio device ID established according to a user habit and the attribute of the audio application. The acquiring the audio devices mapped to the attributes includes: selecting audio device IDs based on preset audio device priorities.

In this embodiment, the codec of the audio device includes, but is not limited to, aptx, LDAC, aptx HD, WBS, aptx adaptive, etc. Bluetooth devices that support aptx, LDAC, and aptx HD may be used as a playback device group mainly used to support the output of music and audio applications. Bluetooth devices that support WBS may be used as a playback device group mainly used to support the output of telephone applications. Bluetooth devices that support aptx adaptive may be used as a playback device group mainly used to support the output of game applications.

The routing table in this embodiment can support the process of self-learning, and record applications frequently used by the user and corresponding device according to the user's usage habits. For example, for a user often uses a Bluetooth speaker A to play music and a game Bluetooth headset B to play games, when the user opens an application, the application is intelligently connected to the corresponding device A or B for the user.

At S303, it is detected whether none of the audio device IDs mapped to the attribute is acquired.

When it is detected that none of the audio device IDs mapped to the attribute is acquired, S304 is executed. Otherwise, S305 is executed.

At S304, an audio device ID selection box is displayed on a display of the terminal device or a voice prompt is issued, and the audio device ID is acquired according to a user selection.

At S305, it is detected whether the number of the acquired audio device IDs mapped to the attribute is one.

When it is detected that the number of the acquired audio device IDs mapped to the attribute is one, S306 is executed. Otherwise, S307 is executed.

At S306, an audio device corresponding to the audio device ID is activated.

At S307, a preset number of target audio device IDs are acquired from at least two audio device IDs according to preset priorities; and the audio devices corresponding to the target audio device IDs are activated.

The preset number includes: one or at least two. When at least two audio device IDs mapped to the attribute of the audio application are acquired and it is detected that the terminal device supports playing one audio application through at least two audio devices simultaneously, a preset number of audio device IDs supported by the terminal device are acquired according to the preset priorities.

If a user answers an incoming call while listening to music using a device A that supports Aptx coding, switching is intelligently performed to connect to a device B that supports WBS to play audio, or a selection box pops up on the display of the terminal device for the user to select or confirm whether to switch the audio device to output the call, or a device that the user is accustomed to using is switched to. Priorities may be set for device switching based on user habits and intelligent device switching based parameters and codecs. A highest priority may be set for device switching based on user habits.

For a terminal device that supports playing of multiple applications through different Bluetooth devices, when it is detected that a music application is about to play music, an optimal Bluetooth device A is selected for the music application. Subsequently when a game application is opened, and it is found that the optimal device A for game playback is already occupied by the music application, switching may be performed to connect the music application to another optimal Bluetooth device B and connect the game application to the device A.

According to the method for activating an audio device provided in the embodiments of the present disclosure, when switching is performed from a first audio application to a second audio application, an attribute of the second audio application is acquired. One or at least two audio device IDs mapped to the attribute of the second audio application are acquired from a preset audio device switching routing table according to the attribute of the second audio application. When it is detected that none of the audio device IDs mapped to the attribute is acquired, an audio device ID selection box is displayed on the display of the terminal device or a voice prompt is issued, and the audio device ID is acquired according to a user selection. When it is detected that the number of the acquired audio device IDs mapped to the attribute is one, the audio device corresponding to the one audio device ID is activated. When it is detected that the number of the acquired audio device IDs mapped to the attribute is more than one, a preset number of audio device IDs supported by the terminal device are acquired according to preset priorities and activated. In some implementation processes, technical effects including but not limited to allowing the user to switch to an appropriate audio device and realizing the intelligent selection of an appropriate audio device for playback according to the attributes of different playback applications can be achieved, thereby improving the user experience.

Embodiment Four

To solve the technical problems of poor user experience in terminal device audio playing and complicated operation of audio device switching, the present disclosure provides a terminal device, which will be described below in connection with this embodiment.

Figure 4:
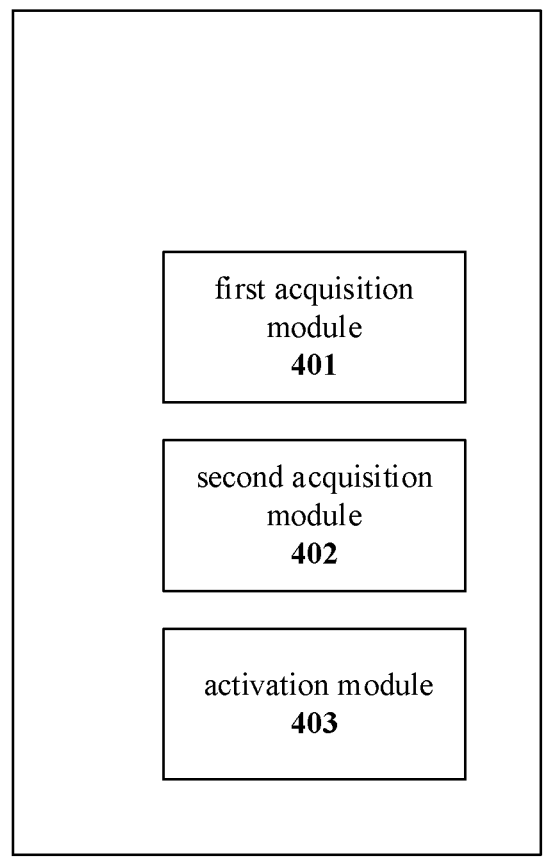
FIG. 4 is a schematic structural diagram of a terminal device according to Embodiment Four of the present disclosure.

Referring to FIG. 4, FIG. 4 is a schematic structural diagram of a terminal device according to Embodiment Four of the present disclosure. The terminal device includes a first acquisition module 401, a second acquisition module 402, and an activation module 403.

The first acquisition module 401 is configured for acquiring an attribute of an audio application.

The second acquisition module 402 is configured for acquiring an audio device identification (ID) mapped to the attribute from a preset audio device switching routing table according to the attribute, where the audio device ID mapped to the attribute includes: an audio device ID of an audio device codec corresponding to the attribute.

The activation module 403 is configured for activating an audio device corresponding to the audio device ID.

In this embodiment, the audio device may be a wired audio playback device or a wireless audio playback device. The wireless audio playback device includes a Bluetooth playback device. The description of the above audio devices is given by way of example only, and the present disclosure is not limited to the above audio devices.

In this embodiment, when there is one audio application, the opening of the audio application may include: opening or downloading an audio application for the first time or switching from a first audio application to a second audio application. For example, Tencent Meeting is opened for the first time; or switching from NetEase Cloud Music to a WeChat call is performed. The above examples are for description purposes only and are not intended to limit the specific audio application type.

In some embodiments, in a case where there are at least two audio applications, when the audio applications are opened, the acquiring an attribute of an audio application includes: when at least two audio applications are opened successively, acquiring attributes of the at least two audio applications respectively. For example, a user opens QQ Music, Romance of the Three Kingdoms, Himalaya, etc., successively; or the user opens Tencent Meeting and NetEase Cloud Music, and then switches from NetEase Cloud Music to WeChat, etc. The above examples are for description purposes only and are not intended to limit the specific audio application type. In addition, the opening sequence of the at least two audio applications is not limited herein.

The attribute of the audio application includes: a package name of the application and an audio parameter of the application.

In some examples, acquiring an attribute of an audio application may be acquiring an attribute of an audio application when the audio application is opened.

In some embodiments, before acquiring an attribute of an audio application, the method may further include:

if an instruction of selecting an audio device ID is received, acquiring the audio device ID selected by the instruction, and activating an audio device corresponding to the selected audio device ID. Before activating the audio device corresponding to the selected audio device ID, the method may further include: acquiring the attribute of the audio application, establishing a mapping relationship between the attribute of the audio application and the selected audio device ID, and updating the audio device ID mapped to the attribute of the audio application in the preset audio device switching routing table. Updating the routing table may be performed before, after or during the activation of the audio device corresponding to the selected audio device ID.

If the instruction of selecting the audio device ID is not received from the user, the attribute of the audio application is acquired, an audio device ID of an audio device codec corresponding to the attribute is found in the preset audio device switching routing table, and an audio device corresponding to the audio device ID is activated. "Not receiving the instruction of selecting the audio device ID" may be receiving a selection of the user to automatically acquire the audio device ID or automatically jump to acquire the attribute of the audio application when a preset time is reached. A user selection instruction or a voice selection instruction may be received on a display of a terminal device. The audio device ID mapped to the attribute includes: an audio device ID of an audio device codec corresponding to the attribute. The audio device ID may be a serial number or a label corresponding to the audio device.

In some embodiments, the audio device may be a wired audio playback device or a wireless audio playback device. The wireless audio playback device includes a Bluetooth playback device. The description of the above audio devices is given by way of example only, and the present disclosure is not limited to the above audio devices.

In some embodiments, the preset audio device switching routing table includes: the attribute of the audio application, the codec of the audio device, and the audio device ID. The audio device ID may further include: a user-preset audio device ID corresponding to the attribute of the audio application. The acquiring an audio device ID mapped to the attribute of the audio application may further include: acquiring the audio device ID mapped to the attribute from the preset audio device switching routing table according to the attribute of the audio application, and selecting the audio device ID according to a preset audio device priority.

In some embodiments, when there is one audio application, the acquiring an audio device ID mapped to the attribute of the audio application from a preset audio device switching routing table according to the attribute includes: acquiring one or at least two audio device IDs mapped to the attribute of the audio application from the preset audio device switching routing table according to the attribute; and when one audio device ID mapped to the attribute is acquired, activating an audio device corresponding to the audio device ID;

when at least two audio device IDs mapped to the attribute are acquired, acquiring a preset number of target audio device IDs from the at least two audio device IDs; and activating the audio devices corresponding to the target audio device IDs, where the preset number includes: one or at least two. When at least two audio device IDs mapped to the attribute of the audio application are acquired and it is detected that the terminal device supports playing one audio application through at least two audio devices simultaneously, a preset number of audio device IDs supported by the terminal device are acquired according to preset priorities.

In some embodiments, when there is one audio application, the opening of the audio application may include: opening an audio application for the first time or switching from a first audio application to a second audio application. When switching is performed from the first audio application to the second audio application, an attribute of the second audio application is acquired. Activating the audio device mapped to the attribute of the second audio application may include: popping up a selection interface on the display of the terminal device, and according to a selection instruction, activating an audio device corresponding to the audio device ID mapped to the attribute of the second audio application or maintaining a connection of an activated audio device corresponding to the first audio application to the second audio application.

In some embodiments, when there are at least two audio applications, the acquiring an attribute of an audio application includes: when at least two audio applications are opened successively, acquiring attributes of the at least two audio applications respectively. The activating an audio device corresponding to the audio device ID includes: detecting whether the terminal device supports simultaneous audio output of multiple audio applications, and when it is detected that the terminal device supports simultaneous audio output of multiple audio applications, activating different audio devices corresponding to the audio device IDs mapped to the attributes of the at least two audio applications, respectively. When the attributes of the at least two audio applications map the same audio device ID, another audio device ID corresponding to attributes of at least two audio applications is selected automatically.

In some embodiments, when there are at least two audio applications, the acquiring an attribute of an audio application may further include: when at least two audio applications are downloaded successively, acquiring attributes of the at least two audio applications respectively. The attributes of the at least two audio applications may also be acquired respectively after the at least two audio applications are downloaded. As for how to activate the corresponding audio devices after downloading the at least two audio applications successively, the following activation method when at least two audio device applications are opened successively may be adopted, or audio devices corresponding to related audio device IDs may be activated according to a preset rule. The preset rule is: an audio application downloaded earlier has priority in acquiring an audio device ID, and an audio application downloaded later is not allowed to acquire the audio device ID that has already been acquired.

When at least two audio applications are opened successively, attributes of the at least two audio applications are acquired respectively. The activating an audio device corresponding to the audio device ID includes:

when it is detected that a shared audio device ID exists in the audio device IDs mapped to the attributes of the at least two audio applications, activating the audio device in the following manner:

when it is detected that the shared audio device ID is an audio device ID with a highest priority among audio device IDs mapped to an attribute of a fourth audio application, connecting the fourth audio application to an audio device corresponding to the shared audio device ID, and connecting a third audio application to another audio device, where the another audio device is different from the audio device to which the fourth audio application is connected; and when it is detected that the shared audio device ID is not the audio device ID with the highest priority among the audio device IDs mapped to the attribute of the fourth audio application, connecting the fourth audio application to the audio device corresponding to the audio device ID with the highest priority, and maintaining a connection of the third audio application to an audio device to which the third audio application is originally connected. The maintaining a connection of the third audio application to an audio device to which the third audio application is originally connected may further include: detecting whether the originally connected audio device is an audio device with a highest priority for the third audio application, and if not, switching to the audio device with the highest priority. The third audio application is an audio application opened earlier. The fourth audio application is an audio application opened later.

In some embodiments, when it is detected that a shared audio device ID exists in the audio device IDs mapped to the attributes of the at least two audio applications, and the attributes of both the at least two audio applications map multiple audio device IDs, the shared audio device ID is excluded, and the at least two successively opened audio applications are respectively connected to other audio devices.

When it is detected that no shared audio device ID exists in the audio device IDs mapped to the attributes of the at least two audio applications, a method for activating each audio application in the at least two audio applications may be acquiring the audio device ID and activating the related audio device according to the method for activating an application when there is one audio application.

After detecting that the shared audio device ID is an audio device ID with a highest priority among audio device IDs mapped to an attribute of a fourth audio application, the following cases may be further included that:

the attribute of the audio application opened earlier maps at least one audio device ID, and the audio device ID with the highest priority mapped to the attribute of the audio application opened earlier is the same as the audio device ID with the highest priority mapped to the attribute of the audio application opened later; or the attribute of the audio application opened later maps multiple audio device IDs, the attribute of the audio application opened earlier maps at least one audio device ID, and the audio device ID with the highest priority mapped to the attribute of the audio application opened earlier is the same as the audio device ID with the highest priority mapped to the attribute of the audio application opened later; or the attribute of the audio application opened later maps only one audio device ID, the attribute of the audio application opened earlier maps at least one audio device ID, and there is no conflict between the audio device ID with the highest priority of the audio application opened earlier and the audio device ID with the highest priority of the audio application opened later; or the attribute of the audio application opened later maps at least two audio device IDs, the attribute of the audio application opened earlier maps at least one audio device ID, and there is no conflict between the audio device ID with the highest priority mapped to the attribute of the audio application opened earlier and the audio device ID with the highest priority mapped to the attribute of the audio application opened later.

In the above case where the attribute of the audio application opened earlier maps multiple audio device IDs and the attribute of the audio application opened later maps at least one audio device ID, no matter whether there is a conflict between the audio device ID with the highest priority of the audio application opened earlier and the audio device ID with the highest priority of the audio application opened later, the audio application opened earlier may be connected to the audio device corresponding to the audio device ID with the second highest priority. The audio device ID with the second highest priority herein is the audio device ID with the second highest priority among the audio device IDs mapped to the attribute of the audio application opened earlier. The audio application opened earlier may also be connected to another audio device. The another audio device herein may not be the audio device corresponding to the audio device ID mapped to the attribute of the audio application opened earlier. The audio application opened later is connected to an audio device that conflicts with the audio application opened earlier. In the case where the attribute of the audio application opened later maps at least two audio device IDs, the audio application opened later may also be connected to multiple audio devices at the same time, and the number of the audio devices connected may be a number of audio devices supported by the terminal device that are acquired based on preset priorities.

Alternatively, in the case where the attribute of the audio application opened earlier maps multiple audio device IDs, the attribute of the audio application opened later maps at least one audio device ID, and the audio device ID with the highest priority of the audio application opened earlier is the same as the audio device ID with the highest priority of the audio application opened later, the successively opened audio applications may be randomly connected to non-conflicting audio devices respectively.

In the case where the attribute of the audio application opened earlier is mapped to one audio device ID and the attribute of the audio application opened later also maps one audio device ID, the audio application opened earlier is connected to another audio device, where the another audio device is different from the audio devices corresponding to the audio device IDs mapped to the attribute of the audio application opened later. The audio application opened later is connected to an audio device that conflicts with the audio application opened earlier. Connecting the audio application opened earlier to another audio device may include: randomly selecting another audio device or acquiring an audio device ID corresponding to an attribute similar to the attribute of the audio application opened earlier, and connecting the audio application opened earlier to an audio device corresponding to the audio device ID.

According to the terminal device provided in the embodiments of the present disclosure, an attribute of an audio application is acquired; an audio device ID mapped to the attribute is acquired from a preset audio device switching routing table according to the attribute; and an audio device corresponding to the audio device ID is activated. In some implementation processes, technical effects including but not limited to allowing the user to switch to an appropriate audio device and realizing the intelligent selection of an appropriate audio device for playback according to the attributes of different playback applications can be achieved.

Embodiment Five

Figure 5:
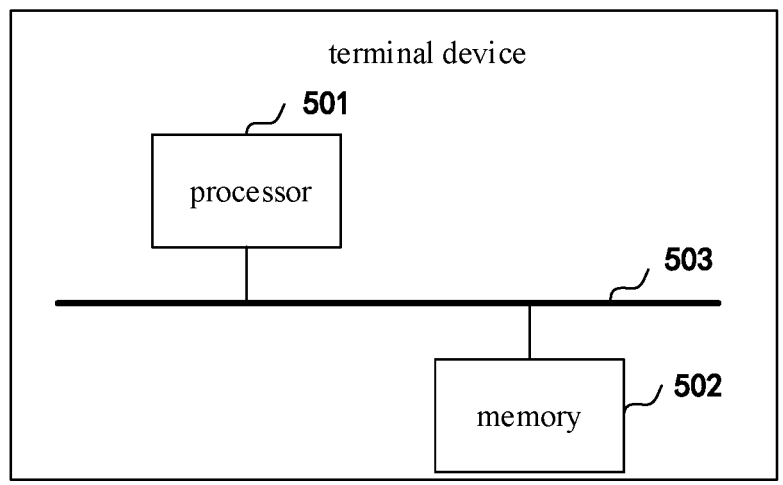
FIG. 5 is a schematic structural diagram of a terminal device according to Embodiment Five of the present disclosure.

This embodiment further provides a terminal device. Referring to FIG. 5, the terminal device includes a processor 501, a memory 502, and a communication bus 503.

The communication bus 503 is configured for implementing connection and communication between the processor 501 and the memory 502.

The processor 501 is configured for executing one or more computer programs stored in the memory 502 to implement at least one step in the method for activating an audio device in any of the above Embodiment One to Embodiment Three.

This embodiment further provides a computer-readable storage medium. The computer-readable storage medium includes volatile or nonvolatile, removable or non-removable media implemented in any method or technology for storage of information (such as computer readable instructions, data structures, computer program modules, or other data). The computer-readable storage medium includes, but is not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer.

The computer-readable storage medium in this embodiment may be configured for storing one or more computer programs which, when executed by a processor, cause the processor to implement at least one step in the method for activating an audio device in any of the above Embodiment One to Embodiment Three.

According to the method for activating an audio device, the terminal device and the computer-readable storage medium provided in the embodiments of the present disclosure, an attribute of an audio application is acquired; an audio device identification (ID) mapped to the attribute is acquired from a preset audio device switching routing table according to the attribute, where the audio device ID mapped to the attribute includes: an audio device ID of an audio device codec corresponding to the attribute; and an audio device corresponding to the audio device ID is activated. In some implementation processes, technical effects including but not limited to allowing the user to switch to an appropriate audio device and realizing the selection of an audio device for playback according to the attributes of different playback applications can be achieved.

Therefore, those having ordinary skills in the art can understand that all or some of the steps in the methods disclosed above and the functional modules/units in the system and the apparatus can be implemented as software (which may be implemented by a computer program code executable by a computing device), firmware, hardware, and appropriate combinations thereof. In a hardware implementation, the division of the functional modules/units mentioned in the above description does not necessarily correspond to the division of physical components. For example, one physical component may have multiple functions, or one function or step may be jointly executed by several physical components. Some or all physical components may be implemented as software executed by a processor, such as a central processing unit, a digital signal processor, or a microprocessor, or as hardware, or as an integrated circuit, such as an application-specific integrated circuit.

In addition, as is known to those having ordinary skills in the art, the communication medium typically includes computer-readable instructions, data structures, computer program modules, or other data in a modulated data signal such as a carrier or other transport mechanism, and can include any information passing medium. Therefore, the present disclosure is not limited to any particular combination of hardware and software.

The foregoing is a further detailed description of the present disclosure in connection with some embodiments, and it should not be considered that the implementation of the present disclosure is limited thereto. Some simple deductions or replacements can be made by those having ordinary skills in the art to which the present disclosure pertains without departing from the conception of the present disclosure, which are all regarded as falling within the protection scope of the present disclosure.

What is claimed is:

1. A method for activating an audio device, comprising:
acquiring an attribute of an audio application;
acquiring an audio device identification (ID) mapped to the attribute from a preset audio device switching routing table according to the attribute, wherein the audio device ID mapped to the attribute comprises:
an audio device ID of an audio device codec corresponding to the attribute; and
activating the audio device corresponding to the audio device ID;
wherein in response to a presence of at least two audio applications, acquiring an attribute of an audio application comprises:
in response to at least two audio applications being opened successively, acquiring attributes of the at least two audio applications respectively; and
activating the audio device corresponding to the audio device ID comprises:
in response to detecting that the attribute of the audio application opened later maps at least two audio device IDs, that the attribute of the audio application opened earlier maps one audio device ID, and that a shared audio device ID is an audio device ID with a highest priority among the audio device IDs mapped to the attribute of the audio application opened later, connecting the audio application opened later to an audio device corresponding to the audio device ID with a second highest priority, and
connecting the audio application opened earlier to an audio device corresponding to the shared audio device ID.

2. The method of claim 1, wherein prior to acquiring an attribute of an audio application, the method further comprises:
in response to receiving an instruction of selecting an audio device ID, acquiring the selected audio device ID, and activating an audio device corresponding to the selected audio device ID; and
in response to not receiving the instruction of selecting an audio device ID, acquiring the attribute of the audio application.

3. The method of claim 2, wherein prior to activating an audio device corresponding to the selected audio device ID, the method further comprises:
acquiring the attribute of the audio application,
establishing a mapping relationship between the attribute of the audio application and the selected audio device ID, and
updating the preset audio device switching routing table.

4. The method of claim 1, wherein in response to a presence of one audio application, acquiring an audio device ID mapped to the attribute from a preset audio device switching routing table according to the attribute comprises:
acquiring one or at least two audio device IDs mapped to the attribute from the preset audio device switching routing table according to the attribute; and
activating the audio device corresponding to the audio device ID comprises:
in response to acquiring one audio device ID mapped to the attribute, activating an audio device corresponding to the one audio device ID;
in response to acquiring at least two audio device IDs mapped to the attribute, acquiring one or at least two audio device IDs from the at least two audio device IDs according to preset priorities; and
activating one or at least two audio devices corresponding to the one or at least two audio device IDs.

5. The method of claim 1, wherein the acquiring an attribute of an audio application comprises:

in response to switching from a first audio application to a second audio application, acquiring an attribute of the second audio application; and activating the audio device corresponding to the audio device ID comprises:

acquiring an audio device ID mapped to the attribute of the second audio application, and activating the audio device corresponding to the audio device ID; or switching an activated audio device corresponding to the first audio application to connect to the second audio application.

6. The method of claim 1, wherein in response to a presence of at least two audio applications, acquiring an attribute of an audio application comprises:

in response to at least two audio applications being opened successively, acquiring attributes of the at least two audio applications respectively; and activating the audio device corresponding to the audio device ID comprises:

in response to detecting that no shared audio device ID exists in the audio device IDs mapped to the attributes of the at least two audio applications, activating each audio application in the at least two audio applications by:

in response to a presence of one audio application, acquiring an audio device ID mapped to the attribute from a preset audio device switching routing table according to the attribute comprises:

acquiring one or at least two audio device IDs mapped to the attribute from the preset audio device switching routing table according to the attribute; and activating the audio device corresponding to the audio device ID comprises:

in response to acquiring one audio device ID mapped to the attribute, activating an audio device corresponding to the one audio device ID;

in response to acquiring at least two audio device IDs mapped to the attribute, acquiring one or at least two audio device IDs from the at least two audio device IDs according to preset priorities; and activating one or at least two audio devices corresponding to the one or at least two audio device IDs; and in response to detecting that a shared audio device ID exists in the audio device IDs mapped to the attributes of the at least two audio applications, activating the audio device in the following manner:

in response to detecting that the shared audio device ID is an audio device ID with a highest priority among audio device IDs mapped to an attribute of a fourth audio application, connecting the fourth audio application to an audio device corresponding to the shared audio device ID, and connecting a third audio application to another audio device, wherein the another audio device is different from the audio device connected to the fourth audio application;

in response to detecting that the shared audio device ID is not the audio device ID with the highest priority among the audio device IDs mapped to the attribute of the fourth audio application, connecting the fourth audio application to the audio device corresponding to the audio device ID with the highest priority, and maintaining a connection of the third audio application to an audio device to which the third audio application is originally connected, and wherein the third audio application is an audio application opened earlier; and the fourth audio application is an audio application opened later.

7. The method of claim 2, wherein in response to a presence of one audio application, acquiring an audio device ID mapped to the attribute from a preset audio device switching routing table according to the attribute comprises:

acquiring one or at least two audio device IDs mapped to the attribute from the preset audio device switching routing table according to the attribute; and activating the audio device corresponding to the audio device ID comprises:

in response to acquiring one audio device ID mapped to the attribute, activating an audio device corresponding to the one audio device ID;

in response to acquiring at least two audio device IDs mapped to the attribute, acquiring one or at least two audio device IDs from the at least two audio device IDs according to preset priorities; and activating one or at least two audio devices corresponding to the one or at least two audio device IDs.

8. The method of claim 3, wherein in response to a presence of one audio application, acquiring an audio device ID mapped to the attribute from a preset audio device switching routing table according to the attribute comprises:

acquiring one or at least two audio device IDs mapped to the attribute from the preset audio device switching routing table according to the attribute; and activating the audio device corresponding to the audio device ID comprises:

in response to acquiring one audio device ID mapped to the attribute, activating an audio device corresponding to the one audio device ID;

in response to acquiring at least two audio device IDs mapped to the attribute, acquiring one or at least two audio device IDs from the at least two audio device IDs according to preset priorities; and activating one or at least two audio devices corresponding to the one or at least two audio device IDs.

9. The method of claim 2, wherein the acquiring an attribute of an audio application comprises:

in response to switching from a first audio application to a second audio application, acquiring an attribute of the second audio application; and activating the audio device corresponding to the audio device ID comprises:

acquiring an audio device ID mapped to the attribute of the second audio application, and activating the audio device corresponding to the audio device ID; or switching an activated audio device corresponding to the first audio application to connect to the second audio application.

10. A terminal device, comprising a processor, a memory, and a communication bus, wherein:

the communication bus is configured for implementing connection and communication between the processor and the memory; and the processor is configured for executing one or more computer programs stored in the memory to perform a method for activating an audio device, the method comprising:

acquiring an attribute of an audio application;

acquiring an audio device identification (ID) mapped to the attribute from a preset audio device switching routing table according to the attribute, wherein the audio device ID mapped to the attribute comprises:

an audio device ID of an audio device codec corresponding to the attribute; and activating the audio device corresponding to the audio device ID;

wherein in response to a presence of at least two audio applications, acquiring an attribute of an audio application comprises:

in response to at least two audio applications being opened successively, acquiring attributes of the at least two audio applications respectively; and activating the audio device corresponding to the audio device ID comprises:

in response to detecting that the attribute of the audio application opened later maps at least two audio device IDs, that the attribute of the audio application opened earlier maps one audio device ID, and that a shared audio device ID is an audio device ID with a highest priority among the audio device IDs mapped to the attribute of the audio application opened later, connecting the audio application opened later to an audio device corresponding to the audio device ID with a second highest priority, and connecting the audio application opened earlier to an audio device corresponding to the shared audio device ID.

11. A non-transitory computer-readable storage medium storing one or more computer programs which, when executed by one or more processors, cause the one or more processors to perform a method for activating an audio device, the method comprising:

acquiring an attribute of an audio application;

acquiring an audio device identification (ID) mapped to the attribute from a preset audio device switching routing table according to the attribute, wherein the audio device ID mapped to the attribute comprises:

an audio device ID of an audio device codec corresponding to the attribute; and activating the audio device corresponding to the audio device ID;

wherein in response to a presence of at least two audio applications, acquiring an attribute of an audio application comprises:

in response to at least two audio applications being opened successively, acquiring attributes of the at least two audio applications respectively; and activating the audio device corresponding to the audio device ID comprises:

in response to detecting that the attribute of the audio application opened later maps at least two audio device IDs, that the attribute of the audio application opened earlier maps one audio device ID, and that a shared audio device ID is an audio device ID with a highest priority among the audio device IDs mapped to the attribute of the audio application opened later, connecting the audio application opened later to an audio device corresponding to the audio device ID with a second highest priority, and connecting the audio application opened earlier to an audio device corresponding to the shared audio device ID.

* * * * *